(12) United States Patent
Lai et al.

(10) Patent No.: US 12,555,109 B2
(45) Date of Patent: Feb. 17, 2026

(54) DETERMINISTIC CONCURRENCY CONTROL FOR PRIVATE BLOCKCHAINS

(71) Applicant: Centre for Perceptual and Interactive Intelligence (CPII) Limited, Pak Shek Kok (CN)

(72) Inventors: Ziliang Lai, Pak Shek Kok (CN); Chris Liu, Pak Shek Kok (CN); Eric Lo, Pak Shek Kok (CN)

(73) Assignee: Centre for Perceptual and Interactive Intelligence (CPII) Limited, Hong Kong (CN)

( * ) Notice: Subject to any disclaimer, the term of this patent is extended or adjusted under 35 U.S.C. 154(b) by 251 days.

(21) Appl. No.: 18/113,521

(22) Filed: Feb. 23, 2023

(65) Prior Publication Data
US 2024/0303659 A1    Sep. 12, 2024

(51) Int. Cl.
| | | |
|---|---|---|
| *G06F 16/00* | (2019.01) | |
| *G06F 9/46* | (2006.01) | |
| *G06F 16/23* | (2019.01) | |
| *G06Q 20/38* | (2012.01) | |
| *G06Q 20/40* | (2012.01) | |

(52) U.S. Cl.
CPC ......... *G06Q 20/4014* (2013.01); *G06F 9/465* (2013.01); *G06F 16/2365* (2019.01); *G06Q 20/389* (2013.01)

(58) Field of Classification Search
CPC . G06F 16/2365; G06F 9/465; G06Q 20/4014; G06Q 20/389
USPC ........................................................ 707/703
See application file for complete search history.

(56) References Cited

U.S. PATENT DOCUMENTS

| | | | | |
|---|---|---|---|---|
| 2018/0158034 A1* | 6/2018 | Hunt | ...................... | G06Q 20/00 |
| 2018/0374086 A1* | 12/2018 | Ardashev | .............. | G06F 16/219 |
| 2021/0194672 A1* | 6/2021 | Narayanam | .......... | G06F 9/4418 |
| 2022/0100733 A1* | 3/2022 | Tock | ..................... | H04L 9/3239 |

* cited by examiner

*Primary Examiner* — Raquel Perez-Arroyo
(74) *Attorney, Agent, or Firm* — Kilpatrick Townsend and Stockton LLP

(57) ABSTRACT

A deterministic concurrency control protocol for a blockchain is described. A set of transactions of the blockchain are received at a node. A simulation step and a commit step are performed to process the transactions. A dependency graph is generated comprising the set of transactions and a set of dependencies between the set of transactions, the set of dependencies including one or more read-write dependencies. A backward dangerous structure is identified in the dependency graph. The backward dangerous structure includes a first read-write dependency from a second transaction to a first transaction, and a second read-write dependency from a third transaction to the second transaction. A transaction is aborted based on the identified backward dangerous structure. Each non-aborted transaction is committed. Steps for update reordering, update coalescence, and inter-block parallelism are described.

17 Claims, 10 Drawing Sheets

DETERMINISTIC CONCURRENCY CONTROL FOR PRIVATE BLOCKCHAINS

BACKGROUND OF THE INVENTION

A private blockchain is a decentralized, distributed ledger system that is controlled by a single organization or a group of organizations. Unlike public blockchain systems, a private blockchain is not open to the public and is typically used for a specific purpose or within a specific industry. Because the network is not open to the public, the organization or group of organizations controlling the network can implement strict security measures to prevent unauthorized access or tampering. Additionally, the organization or group can control who is allowed to participate in the network, allowing for greater control over who has access to sensitive information.

The consensus layer of a blockchain is the mechanism by which the network reaches consensus on the state of the ledger. This is the process by which transactions are validated and added to the blockchain. The database layer of a blockchain, also known as the storage layer, is responsible for storing the data that is added to the blockchain. This data is usually stored in a distributed manner across all the nodes in the network, which ensures that the data is always available and cannot be tampered with or deleted. The database layer is typically implemented using a distributed ledger technology, such as a distributed hash table or a distributed database.

BRIEF SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of processing a set of transactions from one or more blocks in a blockchain, the method comprising: receiving the set of transactions at a node; performing a simulation step by: generating a dependency graph comprising the set of transactions and a set of dependencies between the set of transactions, the set of dependencies including one or more read-write dependencies; determine whether a dangerous structure is present in the dependency graph, the dangerous structure including a first read-write dependency from a second transaction to a first transaction, and a second read-write dependency from a third transaction to the second transaction; and identifying the dangerous structure in the dependency graph; and performing a commit step by: in response to determining that the dangerous structure is identified in the dependency graph, aborting one transaction from the first transaction, the second transaction, and the third transaction; and committing each non-aborted transaction of the first transaction, the second transaction, and the third transaction.

Example 2 is the method of example(s) 1, wherein identifying the dangerous structure in the dependency graph includes: determining that a transaction ID of the first transaction is less than a transaction ID of the second transaction; and determining that the transaction ID of the first transaction is less than or equal to a transaction ID of the third transaction.

Example 3 is the method of example(s) 1-2, wherein, during the commit step, the second transaction is aborted and the first transaction and the third transaction are committed.

Example 4 is the method of example(s) 1-3, wherein the first transaction, the second transaction, and the third transaction are from a same block in the blockchain.

Example 5 is the method of example(s) 1, wherein the one or more blocks in the blockchain include a first block and a second block immediately following the first block, wherein at least one of the first transaction, the second transaction, and the third transaction is from the first block, and wherein at least one of the first transaction, the second transaction, and the third transaction is from the second block.

Example 6 is the method of example(s) 5, wherein, during the commit step: if the second transaction and the third transaction are from the second block, the second transaction is aborted and the first transaction and the third transaction are committed; and if the second transaction is from the first block and the third transaction is from the second block, the third transaction is aborted and the first transaction and the second transaction are committed.

Example 7 is the method of example(s) 1-6, wherein the simulation step and the commit step are performed without using static analysis.

Example 8 is a system comprising: one or more processors; and a computer-readable medium comprising instructions that, when executed by the one or more processors, cause the one or more processors to perform operations comprising: receiving a set of transactions from one or more blocks in a blockchain at a node; performing a simulation step by: generating a dependency graph comprising the set of transactions and a set of dependencies between the set of transactions, the set of dependencies including one or more read-write dependencies; determine whether a dangerous structure is present in the dependency graph, the dangerous structure including a first read-write dependency from a second transaction to a first transaction, and a second read-write dependency from a third transaction to the second transaction; and identifying the dangerous structure in the dependency graph; and performing a commit step by: in response to determining that the dangerous structure is identified in the dependency graph, aborting one transaction from the first transaction, the second transaction, and the third transaction; and committing each non-aborted transaction of the first transaction, the second transaction, and the third transaction.

Example 9 is the system of example(s) 8, wherein identifying the dangerous structure in the dependency graph includes: determining that a transaction ID of the first transaction is less than a transaction ID of the second transaction; and determining that the transaction ID of the first transaction is less than or equal to a transaction ID of the third transaction.

Example 10 is the system of example(s) 8-9, wherein, during the commit step, the second transaction is aborted and the first transaction and the third transaction are committed.

Example 11 is the system of example(s) 8-10, wherein the first transaction, the second transaction, and the third transaction are from a same block in the blockchain.

Example 12 is the system of example(s) 8, wherein the one or more blocks in the blockchain include a first block and a second block immediately following the first block, wherein at least one of the first transaction, the second transaction, and the third transaction is from the first block, and wherein at least one of the first transaction, the second transaction, and the third transaction is from the second block.

Example 13 is the system of example(s) 12, wherein, during the commit step: if the second transaction and the third transaction are from the second block, the second transaction is aborted and the first transaction and the third transaction are committed; and if the second transaction is from the first block and the third transaction is from the second block, the third transaction is aborted and the first transaction and the second transaction are committed.

Example 14 is the system of example(s) 8-13, wherein the simulation step and the commit step are performed without using static analysis.

Example 15 is a non-transitory computer-readable medium comprising instructions that, when executed by one or more processors, cause the one or more processors to perform operations comprising: receiving a set of transactions from one or more blocks in a blockchain at a node; performing a simulation step by: generating a dependency graph comprising the set of transactions and a set of dependencies between the set of transactions, the set of dependencies including one or more read-write dependencies; determine whether a dangerous structure is present in the dependency graph, the dangerous structure including a first read-write dependency from a second transaction to a first transaction, and a second read-write dependency from a third transaction to the second transaction; and identifying the dangerous structure in the dependency graph; and performing a commit step by: in response to determining that the dangerous structure is identified in the dependency graph, aborting one transaction from the first transaction, the second transaction, and the third transaction; and committing each non-aborted transaction of the first transaction, the second transaction, and the third transaction.

Example 16 is the non-transitory computer-readable medium of example(s) 15, wherein identifying the dangerous structure in the dependency graph includes: determining that a transaction ID of the first transaction is less than a transaction ID of the second transaction; and determining that the transaction ID of the first transaction is less than or equal to a transaction ID of the third transaction.

Example 17 is the non-transitory computer-readable medium of example(s) 15-16, wherein, during the commit step, the second transaction is aborted and the first transaction and the third transaction are committed.

Example 18 is the non-transitory computer-readable medium of example(s) 15-17, wherein the first transaction, the second transaction, and the third transaction are from a same block in the blockchain.

Example 19 is the non-transitory computer-readable medium of example(s) 15, wherein the one or more blocks in the blockchain include a first block and a second block immediately following the first block, wherein at least one of the first transaction, the second transaction, and the third transaction is from the first block, and wherein at least one of the first transaction, the second transaction, and the third transaction is from the second block.

Example 20 is the non-transitory computer-readable medium of example(s) 19, wherein, during the commit step: if the second transaction and the third transaction are from the second block, the second transaction is aborted and the first transaction and the third transaction are committed; and if the second transaction is from the first block and the third transaction is from the second block, the third transaction is aborted and the first transaction and the second transaction are committed.

Example 21 is the method of example(s) 1, further comprising: performing update reordering and update coalescence on the set of transactions in accordance with Algorithm 2 by, for example, generating a set of update commands, sorting the set of update commands, coalescing the set of update commands, and applying the coalesced set of update commands.

Example 22 is the system of example(s) 8, wherein the operations further comprise: performing update reordering and update coalescence on the set of transactions in accordance with Algorithm 2 by, for example, generating a set of update commands, sorting the set of update commands, coalescing the set of update commands, and applying the coalesced set of update commands.

Example 23 is the non-transitory computer-readable medium of example(s) 15, wherein the operations further comprise: performing update reordering and update coalescence on the set of transactions in accordance with Algorithm 2 by, for example, generating a set of update commands, sorting the set of update commands, coalescing the set of update commands, and applying the coalesced set of update commands.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Figure 1:
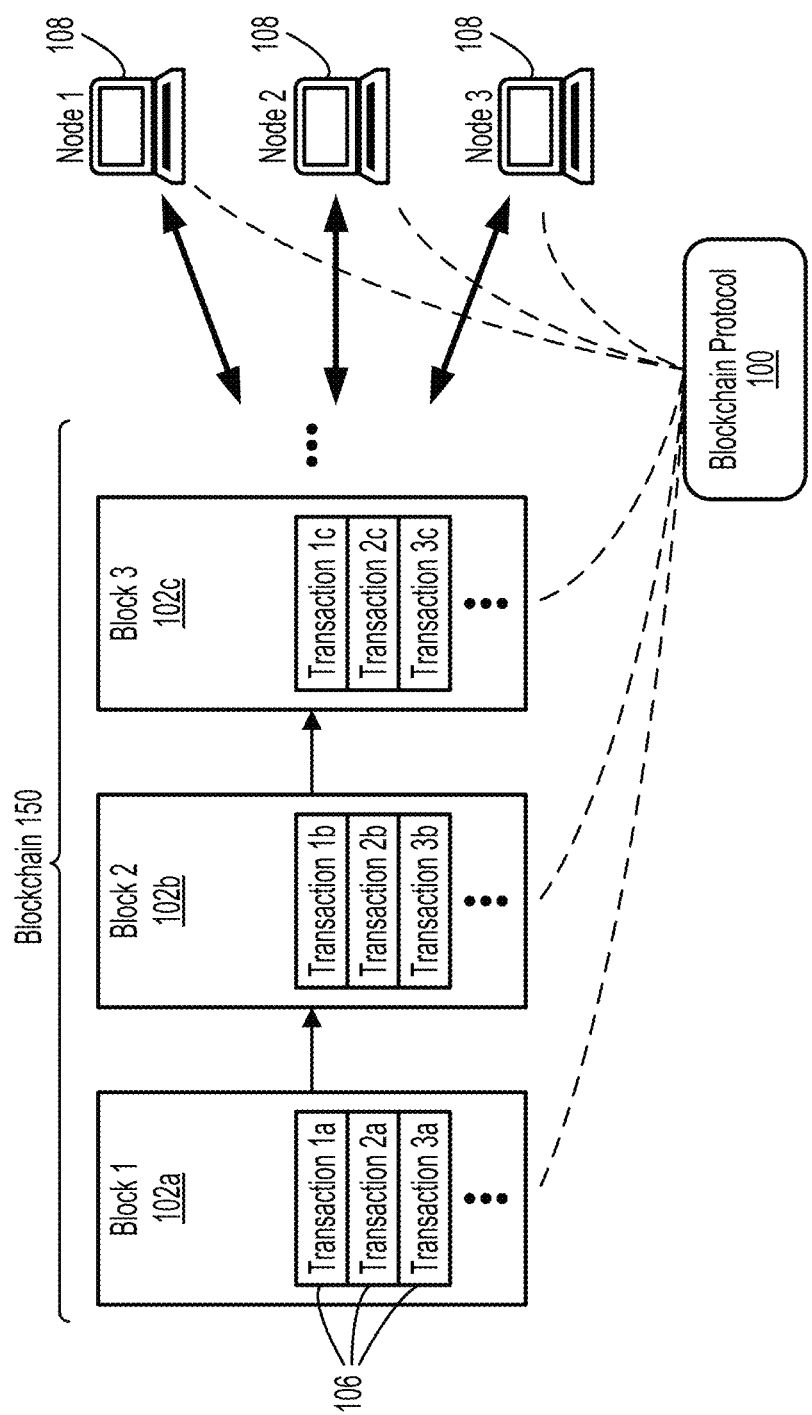
FIG. 1 illustrates an example of a blockchain that implements a deterministic concurrency control protocol.

A blockchain is a ledger replicated on every peer in the system. Internally, it has a consensus layer to ensure all non-faulty replicas agree on the same blocks of the transactions and process each block of transactions with a database layer. The consensus layer is the bottleneck when the database layer is main-memory resident, e.g., data in dynamic random-access memory (DRAM) and group commit logs to disk (e.g., ResilientDB). However, the bottleneck stays in the database layer when the blockchain is disk-oriented. Many conventional enterprise-grade blockchains are disk-oriented (e.g., IBM Fabric, Facebook Diem, IBM RBC, ChainifyDB) because of a lower deployment cost and various use cases (e.g., IoT device has limited memory, wimpy systems). Optimizing the database layer has been proven to improve overall throughput in disk-oriented blockchains as it has been identified as the bottleneck in these systems.

The consensus layer often collects transactions from clients and broadcasts transaction blocks to all replicas. Hence, as long as every replica receives and executes the same set of transactions in the database layer deterministically, all replicas will reach the same state, effectively achieving replica consistency. While concurrent transaction execution is important to boosting the throughput of the database layer, classic concurrency control protocols may be insufficient to uphold replica consistency due to non-determinism—given the same transaction block, replicas using the same concurrency control protocol may reach divergent states since they may get different serializable schedules. Consequently, state-of-the-art private blockchains may use different forms of deterministic concurrency control implicitly to uphold replica consistency with concurrent execution.

Some embodiments of the present invention relate to disk-oriented blockchains (or simply "blockchains") that narrow the throughput gap between the database layer and the consensus layer. Some embodiments relate to private blockchains that exploit the benefits of deterministic databases by leveraging the many similarities between the two. For example, both private blockchains and deterministic databases are distributed in nature, both process transactions block-by-block, and both mandate consistent states across replicas, with blockchains regarding replica consistency as a requirement while deterministic databases achieve replica consistency as a consequence. By exploiting the connections between them, it is possible to fast-forward the development of private blockchains using lessons learned from deterministic databases. Some embodiments relate to a modification of a relational database to become a private blockchain. Some embodiments of the present invention relate to a deterministic concurrency control protocol designed for blockchains, which may be referred to herein as blockchain protocol 100 (see FIG. 1). Blockchain protocol 100 features (i) low abort rates, (ii) hotspot resiliency, and (iii) inter-block parallelism, all of which can be important to blockchains.

Some embodiments of the present invention relate to a private blockchain, referred to herein as blockchain 150 (see FIG. 1). In some embodiments, blockchain 150 may chainify PostgreSQL using blockchain protocol 100. In such embodiments, blockchain 150 inherits many of the features from PostgreSQL such that it is one of the few blockchains that can support SQL and stored procedures as smart contracts. Most existing deterministic databases (e.g., Calvin, BOHM, PWV) require a static analysis on the stored procedures to extract their read-write sets for deterministic scheduling. However, stored procedures often contain branches that predicate on the query results, which impede static analysis. Blockchain 150 does not have such a limitation. Blockchain 150 has been extensively evaluated using benchmarks commonly used in blockchains including YCSB and SmallBank, and a relational benchmark-TPC-C. Empirical results show that Blockchain 150 offers 2.0× to 3.5× better throughput than RBC and FastFabric #, and 2.3× better throughput than AriaBC under high contention.

Many benefits can be achieved by way of the present invention. For example, compared to state-of-the-art deterministic databases, blockchain protocol 100 is specially optimized to achieve low abort rates because an abort in a blockchain may be significantly more expensive than an abort in a main-memory database—a transaction in blockchain involves not only expensive disk I/Os but also network round trips and cryptographic operations. As another example, embodiments can reduce the effects of hotspots, which are typically problematic for modern transactional workloads. A hotspot is a handful of database records that are frequently updated. Hotspots could worsen the number of aborts of a concurrency control protocol. By minimizing aborts, blockchain protocol 100 can resolve the problem associated with hotspots.

As yet another example, unlike all deterministic databases, blockchain protocol 100 supports inter-block parallelism. Inter-block parallelism allows a block to start processing before its previous block ends. It is advantageous in blockchain because the complex interplay between I/O, network access, and caching may result in higher transaction latency variance within a block. Hence, without inter-block parallelism, a blockchain would suffer from resource under-utilization that limits its throughput (e.g., a straggler transaction in a block would idle CPU cores as well as block the pipeline). Overall, blockchain protocol 100 as a deterministic optimistic concurrency control protocol has overcome the challenge of reducing aborts with minimal serializability check overhead and supporting inter-block parallelism.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 106 may reference element "06" in FIG. 1, and a similar element may be referenced as 206 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example of a blockchain 150 that implements a deterministic concurrency control protocol, blockchain protocol 100. Blockchain 150 may provide a decentralized, distributed digital ledger that is used to record transactions across a network of computers. In some examples, blockchain 150 includes a series of blocks 102, each containing a set of transactions 106. In some examples, blocks 102 are linked together in a chronological chain, with each block containing a unique code called a hash that links it to the previous block. In some examples, blockchain 150 may be maintained by a network of nodes 108 (or clients), which validate and add new blocks to the chain. These nodes work together to ensure the integrity of blockchain 150 by verifying the authenticity of new transactions and reaching consensus on the current state of the ledger. This can create a tamper-proof and secure system for recording and verifying transactions. In some examples, blockchain 150 may be a private blockchain.

In some examples, a set of nodes 108 may manage blockchain 150 by adding and validating new blocks 102. Each of nodes 108 may store a copy of blockchain 150, and no centralized "official" copy of blockchain 150 may exist. Nodes 108 may communicate with each other via a network, allowing new completed blocks to be broadcasted to each of nodes 108. Upon receiving a block, nodes 108 may each process/execute the transactions contained in the received block in accordance with blockchain protocol 100 to update each node's copy of blockchain 150. Nodes 108 may include suitable computational resources (e.g., processors) and storage resources (e.g., memories) to perform the functionality described herein. In some examples, nodes 108 on blockchain 150 may form a peer-to-peer network.

One feature of blockchain 150 is its ability to process transactions in a decentralized manner, without the need for a central authority or intermediary. This allows for greater transparency, security, and efficiency in the recording and verification of transactions. Additionally, blockchain 150 can be programmed to include smart contracts, which are self-executing contracts with the terms of the agreement written directly into the code. Blockchain 150 has a wide range of potential applications, including digital currencies, supply chain management, and secure record-keeping for industries such as finance, healthcare, and government.

In some examples, blockchain 150 may have a Simulate-Order-Validate (SOV) or an Order-Execute (OE) architecture. SOV is a blockchain architecture in which a transaction has a workflow of "(1) client→(2) endorsers→(3) client→(4) orderer→(5) replicas" to ensure the transaction is consistently executed on all replicas. First, (1) a client submits a transaction T to a subset of replicas (known as endorsers). (2) On arriving at an endorser, T begins its simulation phase and "executes" against the endorser's local latest state without persisting its writes. The purpose of the simulation phase is to collect the read-write set of T, where the read-set contains keys and version numbers for all records read and the write-set contains the updated keys and their new values. Since individual endorsers may catch up with the latest states at different speeds, the read-write sets for the same transaction T may diverge across the replicas. Hence, SOV requires each endorser to sign the read-write set it produced and sends back to the client. After collecting the potentially diverged read-write sets of a transaction from the endorsers, (3) the client follows a predefined policy to pick one read-write set and sends it to an ordering service. (4) The ordering service is often an independent service that serves the consensus layer to collect transactions from all clients and form an agreed block of transactions. After that, the ordering service broadcasts transactions to all replicas in a block-wise manner. (5) On receiving a transaction block, a replica validates the security (e.g., verifying the signatures) and the serializability of the transactions in that block. For the latter, a replica checks if the received read-set of a transaction is still consistent with the replica's local latest version (because it has been a while since the time of getting the read-set in step (1)), aborts T if it has stale reads or commits T to update the replica's local state otherwise.

In the OE architecture, clients submit transactions straight to an ordering service. The job of the ordering service in OE is the same as in SOV-collect client transactions, order them to form transaction blocks, and broadcast blocks to the replicas. Unlike SOV, OE only ships transaction commands around instead of shipping the transaction read-write sets, which saves network bandwidth. On receiving a block of transactions, each replica executes the block independently. To uphold consistency across replicas, one way is to enforce the individual replicas to honor the transaction order in the block by executing the transactions serially.

The architecture of deterministic databases is a Sequence-Execute (SE) architecture, which includes a sequencing layer (which could be as lightweight as a single machine) that collects transactions from client applications and assigns a unique transaction ID (TID) to each transaction. Then, the sequencing layer broadcasts the transactions to the replicas in a block-wise manner. When a block of transactions reaches a replica, every replica executes the transactions using a deterministic concurrency control protocol, with the objective to reach the identical resulting states independently without any coordination.

Concurrency can improve system throughput if properly controlled. Deterministic databases have been focusing on deterministic concurrency control (DCC) to improve throughput, while the state-of-the-art private blockchains also have similar mechanisms (but not named DCC explicitly). A DCC protocol can be pessimistic or optimistic. Pessimistic DCC protocols carefully pre-define a concurrent schedule S for a block of transactions prior to their execution such that every replica can follow S to execute independently. Pre-defining a concurrent schedule for a block of transactions may entail knowing all their potential conflicts a priori. Applying static analysis on a transaction block can achieve that to a certain extent. However, static analysis is insufficient when facing workloads with complex transaction logic (e.g., a stored procedure branches based on run-time query results), which is common in smart contracts. Optimistic DCC protocols provide deterministic concurrency at run-time, hence, it requires no static analysis and is thus more suitable to blockchains. Nonetheless, serializability conflicts may arise at run-time. Therefore, optimistic DCC protocols may entail certain transactions to abort and restart to uphold serializability.

The idea of pessimistic DCC is to pre-compute a concurrent schedule S for a block B of transactions. To achieve that, all pessimistic DCC protocols carry out static analysis on an incoming block B to obtain the read-write sets of its transactions to devise the schedule. Once the read-write sets of the transactions in the block are obtained, pessimistic DCC can devise a deterministic serializable schedule without any aborted transactions. In practice, however, the read-write sets of the transactions in the block are hard to obtain using static analysis on real smart contracts.

Optimistic DCC protocols provide deterministic concurrency at run-time and require no static analysis. Given a transaction T, optimistic DCC first obtains its deterministic read-write set, despite that the states among the replicas may diverge due to different reasons (e.g., message delay). Since the deterministic read-write sets of transactions in a block may contain serializability conflicts, optimistic DCC then follows a deterministic commit protocol to ensure serializability and replica consistency.

Blockchain protocol 100 supports parallel commit with no application limitation. It is superior to the latest DCC Aria when applied to disk-oriented blockchain by featuring (i) low abort rate, (ii) hotspot resiliency, and (iii) inter-block parallelism. Improving the concurrency control of a disk-based database is significant as higher concurrency (and thus higher CPU utilization) can be translated as better overlapping and I/O hiding, and reducing aborts can be translated as maximizing the useful work done per I/O, all of which could lead to higher throughput. These factors motivate the design of better (deterministic) concurrency control for the database layer of disk-based blockchains.

Blockchain protocol 100 is an optimistic DCC protocol. On receiving a block of transactions, it executes transactions in two steps: a simulation step and a commit step, without using static analysis. Like most optimistic DCCs, its simulation step obtains deterministic read-write sets by simulating transactions against the same block snapshot. After all transactions of the current block finish simulation, it enters the commit step to carry out deterministic commit.

Blockchain protocol 100 upholds parallelism by only requiring each transaction to examine dangerous structures without cross-thread coordination. To reduce the abort rate, blockchain protocol 100 carries out abort-minimizing validation that commits all transactions as long as their rw-dependencies do not exhibit a kind of new "backward dangerous structure", while all the other dependencies (e.g., ww-dependencies) are managed by update reordering to ensure serializability without any abort. Blockchain protocol 100 ensures that the whole process is parallelizable and requires no graph traversal.

Blockchain protocol 100 achieves good resource utilization by supporting inter-block parallelism-a straggler transaction in block i cannot detain the next block (i+1). Supporting inter-block parallelism requires dealing with a non-deterministic view of inter-block dependency due to network asynchrony. For example, if $T_1$ in block i depends on $T_2$ in block (i+1) (which is possible when these two blocks are concurrent), a replica may miss such inter-block dependency if block (i+1) is delayed, causing it to see different dependencies from the other replicas. Blockchain protocol 100 designs an inter-block abort policy to ensure deterministic commit under network asynchrony. If inter-block parallelism is disabled, a transaction T starts execution only after the previous block is finished and T's simulation step reads the block snapshot of the previous block.

Formally, there are three types of dependencies:

rw-dependency: transaction $T_i$ rw depends on $T_j$ if $T_i$ reads any before-image of $T_j$'s writes, denoted as $$T_i \xrightarrow{rw} T_j \text{ or equivalently } T_j \xleftarrow{rw} T_i.$$

ww-dependency: transaction $T_i$ ww depends on $T_j$ if $T_j$ overwrites any $T_i$'s write, denoted as $$T_i \xrightarrow{ww} T_j.$$

wr-dependency: transaction $T_i$ wr depends on $T_j$ if any of $T_i$'s writes is read by $T_j$, denoted as $$T_i \xrightarrow{wr} T_j.$$

In some examples, a rw-subgraph is defined as the subgraph induced by rw-dependency edges in the dependency graph (i.e., the dependency graph with only rw-dependencies). To uphold serializability, no cycles can occur in the whole dependency graph. The abort-minimizing validation of blockchain protocol 100 focuses on the rw-subgraph only because other dependencies would be handled by update reordering without any abort. In some examples, the abort-minimizing validation is based on the following rule:

Rule 1—(Validation Rule) A transaction $T_j$ is aborted if it resides in a backward dangerous structure:

$$T_i \xleftarrow{rw} T_j \xleftarrow{rw} T_k, i < j \text{ and } i \le k.$$

Rule 1 has two notable differences from SSI (serializable snapshot isolation): (1) it imposes a reverse order on the TIDs (where the oldest transaction $T_k$ with the largest TID comes first and the youngest transaction $T_i$ with the smallest TID comes last), and more importantly (2) it imposes no constraint on the ww-dependencies (i.e., non-first committer can still win).

Figure 2B:
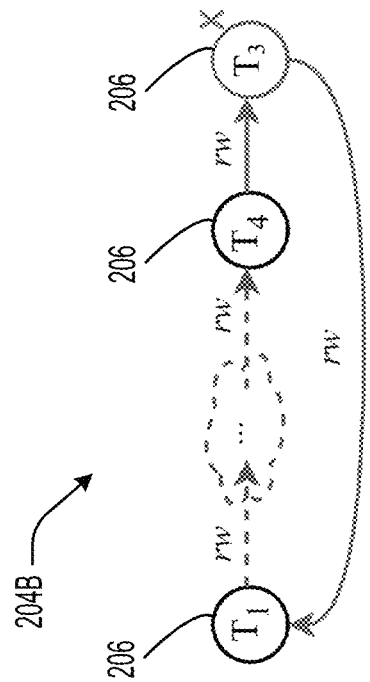
FIGS. 2A and 2B show examples of backward dangerous structures.
Figure 2A:
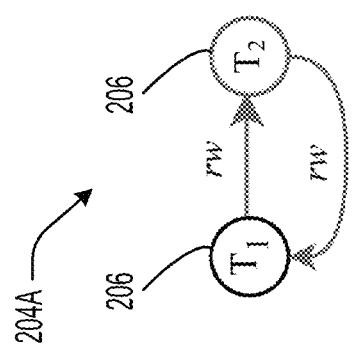

FIGS. 2A and 2B show examples of backward dangerous structures. FIG. 2A depicts a dependency graph 204A with transactions 206 showing a match with only two transactions $T_1$ and $T_2$, and FIG. 2B depicts a dependency graph 204B with transactions 206 showing a match with at least three transactions including $T_1$, $T_2$ and $T_3$. Note that a backward dangerous structure can be as small as having two transactions since i=k is allowed. A dangerous structure can also involve an arbitrary number of transactions $$\left(\text{e.g., FIG. 2B, where } T_1 \xleftarrow{rw} T_3 \xleftarrow{rw} T_4\right).$$

Specifically, given any cycle in the rw-subgraph, the transaction with the smallest TID in the cycle is denoted as $T_1$. Since $T_1$ is in a cycle, there exists $T_j$ such that $$T_i \xleftarrow{rw} T_j,$$

and there also exists $$T_j \xleftarrow{rw} T_k.$$

Thus, $$T_i \xleftarrow{rw} T_j \xleftarrow{rw} T_k$$

can be obtained, which is a backward dangerous structure because $T_i$ has the smallest TID. Therefore, eliminating all the backward dangerous structures breaks all the cycles in the rw-subgraph.

In some examples, Rule 1 could induce some false aborts. Eliminating all false aborts would possibly require an expensive and unparallelizable graph traversal, which may outweigh the gain. Nonetheless, blockchain protocol 100 can induce fewer false aborts than all the dangerous structure-based optimistic DCCs in all cases. Specifically, compared to Fabric which hastily aborts $T_2$ on seeing a single rw-dependency $$T_1 \xleftarrow{rw} T_2,$$

Rule 1 is more judicious as it only aborts $T_2$ on seeing both $$T_1 \xleftarrow{rw} T_2 \text{ and } T_2 \xleftarrow{rw} T_3.$$

Compared to RBC and Aria, blockchain protocol 100 would not abort on seeing a ww-dependency. For ww-dependencies, blockchain protocol 100 reorders the transactions to make them all be able to commit, instead of aborting them.

| Algorithm 1: Blockchain Protocol 100 (no inter-block parallelism) | |
|---|---|
| 1 | Initialize for each transaction $T_j$ do |
| 2 | $T_j \cdot \text{min\_out} \leftarrow j + 1$ |
| 3 | $T_j \cdot \text{max\_in} \leftarrow -\text{inf}$ |
| 4 | and |
| 5 | → In the simulation step: |
| 6 | Event on_seeing_rw_dependency $\left(T_i \xleftarrow{rw} T_j\right)$ |
| 7 | $T_j \cdot \text{min\_out} \leftarrow \min(i, T_j \cdot \text{min\_out})$ |
| 8 | $T_i \cdot \text{max\_in} \leftarrow \max(j, T_i \cdot \text{max\_min})$ |
| 9 | end |
| 10 | In the commit step: |
| 11 | Event on_entering_commit($T_j$) |
| 12 | if $T_j \cdot \text{min\_out} < j \; T_j \cdot \text{min\_out} \le T_j \cdot \text{max\_in}$ then |
| 13 | Abort($T_j$) |
| 14 | else |
| 15 | Apply_write_sets($T_j$) |
| 16 | End |

Algorithm 1 shows the implementation of Rule 1. It contains two event handlers that would be invoked when a specific event happens. In the simulation step, on_seeing_rw_dependency( ) is invoked when a rw-dependency is found (line #6). The handler maintains two variables for each transaction:

minimal outgoing TID of $T_j$:

$$\text{min\_out} = \min\left\{i \;\middle|\; T_i \xleftarrow{rw} T_j, i < j\right\}. \text{ If no } T_i \xleftarrow{rw} T_j(i < j),$$

$$\text{define min\_out} = (j + 1);$$

maximum incoming TID of $T_j$:

$$\text{max\_in} = \max\left\{k \;\middle|\; T_j \xleftarrow{rw} T_k\right\}. \text{ If no } T_j \xleftarrow{rw} T_k, \text{ define max\_in} = -inf.$$

These two variables are used for checking Rule 1 in the commit step. When a transaction $T_1$ enters the commit step, on_entering_commit( ) is invoked and line #12 effectively checks Rule 1. If the transaction is not aborted, it invokes Apply_write_sets( ) to apply the write-sets. Algorithm 1 is highly parallel because both the simulation step and the commit step can process transactions concurrently, and the event handlers could be triggered in parallel.

It can be proved that Algorithm 1 effectively checks Rule 1 showing that a transaction aborted by Rule 1 is also aborted by Algorithm 1 and vice versa. Consider $T_1$ is aborted due to a backward dangerous structure $$T_i \xleftarrow{rw} T_j \xleftarrow{rw} T_k, i < j \text{ and } i \le k.$$

By the definition of min_out, min_out≤i; and by the definition of max_in, max_in≥k. Thus, Algorithm 1 would abort $T_j$ because it satisfies the condition in line #12. Furthermore, consider $T_j$ is aborted by Algorithm 1 due to min_out<j and min_out≤max_in. There exists $T_{min\_out}$ and $T_{max\_in}$ such that $$T_{min\_out} \xleftarrow{rw} T_j \xleftarrow{rw} T_{max\_in}$$

is a backward dangerous structure. Thus $T_j$ is also aborted by Rule 1.

Blockchain protocol 100 does not have phantoms because a predicate-read will also trigger on_seeing_rw_dependency( ) if it induces a rw-dependency. Let e be the number of rw-dependencies of a transaction $T_j$. Algorithm 1 only takes O(e) time because each rw-dependency of $T_j$ is only examined once. In contrast, the validation phase in the original SSI takes O($e^2$) time to check every pair of rw-dependencies incident to/from transaction $T_j$.

Given an acyclic rw-subgraph, blockchain protocol 100 ensures the whole dependency graph is acyclic by update reordering. During the simulation step of blockchain protocol 100, deterministic read-write sets are obtained. Blockchain protocol 100 keeps the update commands (e.g., add(x, 10)) in the write-set instead of the updated values (e.g., x=20). The update commands are collected in the simulation step when a transaction starts working on an UPDATE statement. For example, when T starts UPDATE bank SET balance=balance+10 WHERE id='Alice', blockchain protocol 100 extracts the update command of add (Alice, balance, 10) from the physical plan and stores it in T's write-set without evaluating its value. Blockchain protocol 100 ensures serializability by reordering the update commands using an efficient reordering algorithm. The update commands are then evaluated one after another following that order.

For example, assume $T_1$ and $T_2$ of the same block update x concurrently by add (x, 10) and mul(x, 3), respectively. Existing snapshot-based optimistic DCCs would evaluate both updates against the snapshot value of x (say x=10). Thus, $T_1$ and $T_2$ would store x=20 and x=30 in their write-sets, respectively. However, one of $T_1$ and $T_2$ has to be aborted because neither x=20 nor x=30 is a serializable state of committing both $$\left(\text{e.g., Aria aborts } T_2 \text{ due to } T_1 \xrightarrow{ww} T_2\right).$$

In contrast, blockchain protocol 100 collects add (x, 10) and mul(x, 3) in the simulation step and uses the reordering rule (Rule 2) to determine their order in the commit step. A correct order is necessary to ensure serializability because evaluating $T_2$'s update after $T_1$ induces two dependencies:

$$T_1 \xrightarrow{ww} T_2. \qquad (1)$$

Since $T_2$'s update command mul(x, 3) is a read-modify-write operation, there is another dependency $$T_1 \xrightarrow{wr} T_2. \qquad (2)$$

The induced dependencies could violate serializability if there is already a dependency $$T_1 \xleftarrow{rw} T_2$$

in the rw-subgraph, because it will form a cycle with (1) and/or (2). In this case, $T_1$ should update after $T_2$ such that $$T_1 \xleftarrow{ww/wr} T_2$$

is in the same direction as $$T_1 \xleftarrow{rw} T_2,$$

which does not induce a cycle. Following this order both transactions can be committed: $T_2$ first updates x=mul(x, 3)=30, and then $T_1$ evaluates add(x, 10)=40. That is why blockchain protocol 100 does not have to abort a transaction on seeing a ww-dependency like Aria. As a tradeoff, evaluating the update commands one after another could impede parallelism. To resolve this, concurrency protocol utilizes update coalescence.

Intuitively, the order of the update commands has to follow the direction of the dependencies in the rw-subgraph, such that the edges of ww-dependencies and rw-dependencies also follow that direction to avoid cycles. Theorem 1 formalizes this principle.

Theorem 1—Given an acyclic rw-subgraph, the complete dependency graph is also acyclic if the update commands are reordered based on the topological order of the acyclic rw-subgraph.

To prove Theorem 1 (by contradiction), assume there is still a cycle after reordering the update commands based on the topological order of the rw-subgraph. Then the cycle must contain $$T_i \xrightarrow{wr/ww} T_j$$

because the rw-subgraph is acyclic. $T_i$ and $T_j$ are only considered to be in the same block because of no inter-block parallelism. (1) If $$T_i \xrightarrow{ww} T_j, T_j\text{'s}$$

update is ordered after $T_i$. According to the definition of topological order, there is no directed path from $T_j$ to $T_i$. Thus, $$T_i \xrightarrow{ww} T_j$$

is not in a cycle, which is a contradiction. (2) If $$T_i \xrightarrow{wr} T_j,$$

such dependency is only possible when $T_j$ has a read-modify-write update command and that command is ordered after $T_i$'s update. Therefore, $T_j$ is ordered after $T_1$ in the topological order. Similar to (1), $$T_i \xrightarrow{wr} T_j$$

is not in a cycle, which is also a contradiction.

Although useful, the topological sort in Theorem 1 is expensive and hard to parallelize. Rule 1 is beneficial by not only ensuring an acyclic rw-subgraph, but also allowing the following reordering rule to avoid the topological sort.

Rule 2—(Reordering Rule) Given all backward dangerous structures are eliminated after Rule 1, reorder the transactions that update the same record by the ascending order of their minimal outgoing TIDs (i.e., min_out), and break the tie by their own TIDs.

Rule 2 transforms an expensive topological sort into a quick-sort (i.e., quick-sort by min_out), and it enables parallel reordering because updates on different records can be sorted in parallel.

Figure 3:
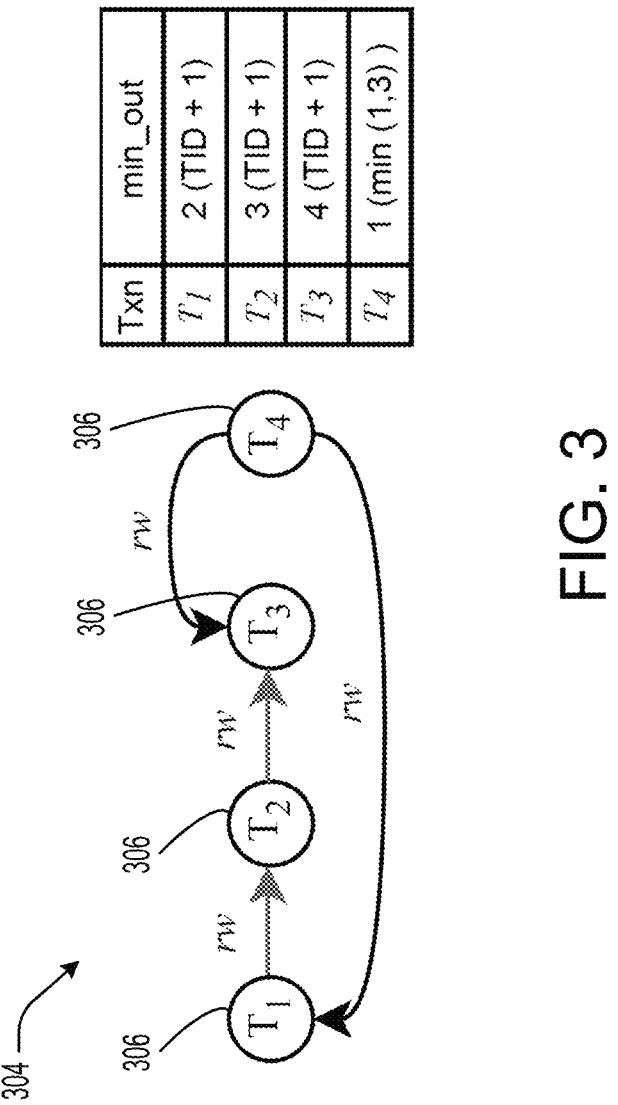
FIG. 3 shows an example of update reordering.

FIG. 3 shows an example of update reordering. Specifically, FIG. 3 shows a dependency graph 304 with transactions 306 without backward dangerous structures. A topological sort on dependency graph 304 results in [$T_4$, $T_1$, $T_2$, $T_3$]. Suppose only $T_2$ and $T_4$ update x, blockchain protocol 100 only needs to quick-sort the min_outs of $T_2$ and $T_4$ without traversing the whole graph like the topological sort. Nonetheless, the resulting order (i.e., [$T_4$, $T_2$]) is consistent with the topological ordering. If $T_1$, $T_2$, and $T_3$ update y, the two updater lists (i.e., [$T_2$, $T_4$] on x and [$T_1$, $T_2$, $T_3$] on y) can be sorted in parallel. It can be shown that Rule 2 is deterministic because the ordering is based on TIDs that are consistent on all replicas. The following theorem shows the correctness of Rule 2.

Theorem 2—After applying Rule 1, the ascending order of min_outs is equivalent to a topological order of the rw-subgraph.

To prove Theorem 2 (by contradiction), assume after applying the Validation Rule, $T_j.\text{min\_out} < T_1.\text{min\_out}$ but $$T_j \xleftarrow{rw} T_i$$

(i.e., min_out order is not consistent with the topological order of the rw-subgraph). (1) If there is no $$T_k \xleftarrow{rw} T_j (k < j),$$

by the definition of min_out, $T_j.\text{min\_out}=j+1$ and $T_i.\text{min\_out} \leq j < T_j.\text{min\_out}$. Therefore, it contradicts with $T_j.\text{min\_out} < T_i.\text{min\_out}$. (2) If there exists $$T_k \xleftarrow{rw} T_j (k < j),$$

by the definition of min_out, $T_j.\text{min\_out} \leq k < j$ and $i > T_1.\text{min\_out}$. By the definition of max_in, $T_j.\text{max\_in} \geq i$. Therefore, $T_j.\text{max\_in} \geq i > T_1.\text{min\_out} > T_j.\text{min\_out}$. Together with $j > T_j.\text{min\_out}$, $T_j$ should have been aborted by the Validation Rule. Thus, it is a contradiction.

Reordering is a technique that can be employed to reduce aborts. Rather than reordering some dependencies after the values are computed, blockchain protocol 100 can reorder more by evaluating the commands in the commit step. Although Rule 2 efficiently computes a serializable update order, efficiently enforcing that order when applying the update commands needs to solve two problems. First, transactions updating the same record would have unnecessarily duplicated disk I/Os and locking (problem P1).

Figure 4:
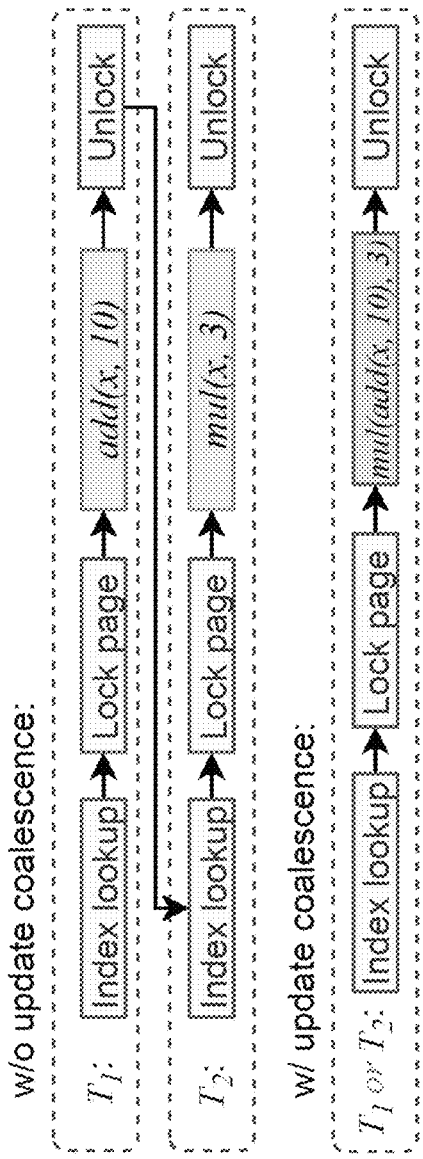
FIG. 4 shows the physical plans of the update commands with and without coalescence.

FIG. 4 shows the physical plans of the update commands with and without coalescence. In the illustrated example, $T_1$ and $T_2$ update x by add(x, 10) and mul(x, 3), respectively, and $T_2$'s update is ordered after $T_1$. Without update coalescence, $T_2$'s physical plan of updating x largely duplicates what $T_1$ does (e.g., index lookup and locking). Second, applying update commands one after another impedes parallelism (problem P2). Since $T_2$ is ordered after $T_1$, $T_2$ would be detained by $T_1$ especially when $T_1$ experiences disk I/Os or $T_1$ itself is detained by another transaction.

Further proposed herein is an update coalescence that merges multiple update commands on the same record into one to mitigate the above problems. Blockchain protocol 100 eliminates duplicated operations and merges the physical plans of updating the same record without affecting the semantics. As shown in FIG. 4, the physical plan after coalescing encodes both $T_1$ and $T_2$'s updates on x and respects the order of $T_1$ followed by $T_2$. In this way, blockchain protocol 100 resolves P1. To resolve P2, blockchain protocol 100 dedicates only one transaction to apply the coalesced update for each record. In FIG. 4, if $T_1$ works on x first, it applies the coalesced update while $T_2$ can simply skip and work on other updates in parallel.

---
Algorithm 2: Update Reordering and Coalescence
---

```
1   → In the simulation step:
2   Event on_update(key, update_command)
3       update_cmds ← update_reservation.search(key)
4       update_cmds.append(update_command)
5       T_current.updated_keys.append(key)
6   end
7   → In the commit step, invoked by Algorithm 1
8   Function Apply_write_sets(T)
9       for each key ∈ T. updated_keys do
10          update_cmds ← update_reservations.search(key)
11          if update cmds handled == False then
12              update_cmds.handled ← True
13              update_cmds.filter(update_command.T.aborted == False)
14              update_cmds.sort_by(update_command.T.min_out)
15              coalesced_update ← coalesce(update_cmds)
16              apply(coalesced_update)
17          end
18      end
19  end
```

Algorithm 2 shows how update reordering and update coalescence fit into blockchain protocol 100. In Algorithm 2, blockchain protocol 100 uses a hash table (update_reservation) to map a key to the list (update_cmds) of the update commands related to it. When the event handler on_update( ) is triggered (line #2), the update command is appended to the corresponding update_cmds list (line #4). The updated key is also appended to the updated_keys list of the transaction (line #5). The function Apply_write_sets(T) does the actual work of update reordering and coalescence, and it is invoked by Algorithm 1 after T passes the validation. For each updated key of T (line #9), the corresponding update_cmds is checked to see if it has already been handled by another transaction (line #11). Lines #11 and #12 ensure that for each updated record, only one transaction handles all updates related to it, and other transactions can skip and work on other updates in parallel (lines #11 and #12 are protected in a critical section). To apply the updates, T first filters out the update commands added by the aborted transactions in the update_cmds (line #13), and then it performs update reordering by sorting the update_cmds based on the min_outs as suggested by Rule 2 (line #14). After that, it coalesces the update commands (as demonstrated in FIG. 4) and applies the coalesced update (line #16).

There are two corner cases that are not explicitly handled in Algorithm 2: (1) T reads an x that has been updated by itself via a command op(x), and (2) T updates x more than once. For (1), T retrieves op(x) in the update_reservation table and evaluates it for the read operation. Note that op(x) may be evaluated twice in this case (i.e., once for the read in the simulation step and once after update reordering in the commit step), but both evaluations are guaranteed to return the same value since Rule 2 respects serializability. For (2), when T inserts the second update command to x's update_cmds list, it coalesces the second update command with the first one such that the update_cmds effectively only contains at most one update command for each transaction.

With update reordering and coalescence, blockchain protocol 100 achieves hotspot resiliency because the former allows all concurrent updaters to commit, and the latter coalesces many updates of a hotspot into one. Overall, update reordering and coalescence handle updates at the command level rather than at the value level, giving them a complete picture to optimize. Nonetheless, those opportunities might be lost in case a smart contract developer separates the read-modify-write logic. For example, consider UPDATE . . . SET X=X+1 WHERE Y=10, which can be reordered and coalesced with other update statements. However, the opportunity would be lost if the developer expresses the logic as three pieces in a stored procedure: (1) first read the value of X using a SQL SELECT, (2) increment X, and (3) finally write the updated value of X using a SQL UPDATE. For some cases, the query optimizer may be able to rewrite them into one. Otherwise, smart contract developers are to express the entire read-modify-write logic as one SQL statement.

Inter-block parallelism aims to improve resource utilization in case a straggler transaction in block (i−1) detains the next block i. Concretely, when block (i−1) spares some resources (e.g., most transactions in block (i−1) are finished but a straggler is still running), blockchain protocol 100 would start some transactions from block i to utilize the spared resources before the whole block (i−1) finishes. When inter-block parallelism is enabled, transactions in block i carry out the simulation step based on the snapshot of block (i−2) instead of block (i−1), since the latter may not be ready when block i starts. Although adjacent blocks could run concurrently, blockchain protocol 100 still runs the commit step of block (i−1) before the commit step of block i to uphold determinism. As a tradeoff, inter-block parallelism may introduce inter-block dependencies that increase aborts.

The validation of blockchain protocol 100 (Rule 1) can be enhanced to handle inter-block dependencies. For example, if T in block i reads x from the snapshot of block (i−2) and T' in block (i−1) updates x, there is an inter-block rw-dependency denoted as $$T' \xleftarrow{inter-rw} T$$

(a prefix of "intra" or "inter" is added for clarity). Moreover, inter-block dependencies may cause non-determinism due to network asynchrony.

Figure 5:
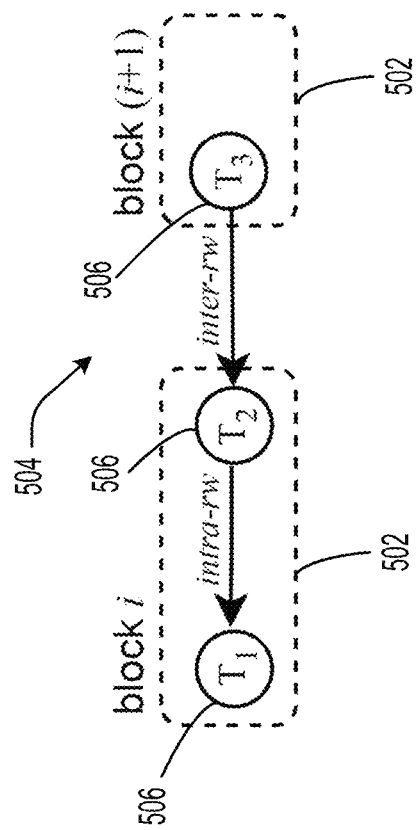
FIG. 5 shows an example of a backward dangerous structure.

FIG. 5 shows an example of a backward dangerous structure. Specifically, FIG. 5 shows a dependency graph 504 with blocks 502 and transactions 306. Without the Enhanced Validation Rule, the example in FIG. 5 may cause non-determinism. A replica R1 who sees the whole backward dangerous structure would abort $T_2$. However, if block (i+1) arrives late in replica R2 due to network asynchrony, R2 would commit $T_2$ because when applying Rule 1, R2 only sees $$T_1 \xleftarrow{intra-rw} T_2.$$

This causes inconsistency between R1 and R2. To deal with the inter-block dependencies (denoted as inter-dep), blockchain protocol 100 uses an enhanced validation rule.

Rule 3—(Enhanced Validation Rule) For each generalized backward dangerous structure:

$$T_i \xleftarrow{inter-dep/intra-rw} T_j \xleftarrow{inter-dep/intra-rw} T_k, i < j \text{ and } i \le k,$$

apply the following abort policy:
(i) if $T_j$ and $T_k$ are in the same block, abort $T_j$;
(ii) otherwise, abort $T_k$.

Rule 3 is identical to Rule 1 if there are no inter-block dependencies. The additional abort policy (ii) ensures determinism despite network asynchrony. Specifically, consider the case in FIG. 5, if block (i+1) is not delayed in the replica R1, it would abort $T_3$ instead of $T_2$ according to the abort policy (ii); suppose another replica R2 sees $$T_1 \xleftarrow{intra-rw} T_2$$

first and then sees $$T_2 \xleftarrow{inter-rw} T_3$$

later due to the delayed block (i+1). R2 would also abort $T_3$. This ensures that R1 is consistent with R2.

It can be proven that Rules 3 and 2 together ensure serializability and are deterministic. With respect to serializability, after applying both rules, it can be shown that (a) there is no cycle within each block, and (b) there is no cycle across blocks. The correctness of (a) follows the fact that Rule 3 is equivalent to Rule 2 when no inter-block dependencies are considered. For (b), Rule 3 considers all the backward dangerous structures across blocks by adding inter-block dependencies into the generalized backward dangerous structure. Similar to how Rule 1 breaks the cycles in the rw-subgraph by eliminating backward dangerous structures, eliminating the generalized backward dangerous structure breaks the cycles across blocks. With respect to determinism, even with inter-block parallelism, blockchain protocol 100 enforces the blocks to enter their commit steps in the order of block ID. Thus, the blocks apply Rules 3 and 2 in a deterministic order. Since it has been shown that Rules 3 and 2 are deterministic, it can be concluded that blockchain protocol 100 is deterministic with inter-block parallelism.

In some embodiments of the present invention, a private blockchain, such as blockchain 150, can be built using blockchain protocol 100. As discussed above, private blockchains have two major architectures, SOV and OE. Blockchain 150 can adopt the OE architecture because it has no network overhead of sending large read-write sets. Also, blockchain protocol 100 fits the OE architecture better because it only requires blocks of transaction commands as input. Blockchain protocol 100 can be implemented on PostgreSQL, a disk-based relational database, for the database layer. As such, concurrency protocol has the full functionalities of a relational database. Since PostgreSQL is process-based, concurrency is achieved by executing all transactions in a block using multiple processes in parallel.

In some examples, the consensus layer of blockchain 150 is a pluggable module and can support the Byzantine-fault tolerant HotStuff and crash-fault tolerant Kafka. Private blockchains typically rely on the consensus layer to uphold the safety and liveness guarantees. With a BFT consensus layer (e.g., HotStuff), blockchain 150 is also BFT because a faulty database node can only tamper its own state without affecting the non-faulty majority.

Blockchain 150 has lightweight logical logging for crash-fault recovery because of determinism. It persists the small input blocks before execution instead of the large ARIES-like log. It utilizes the CHECKPOINT command in PostgreSQL to flush dirty pages to disk every p blocks (e.g., p=10). After checkpointing, the ID of the latest checkpointed block is also persisted into a block_checkpoint_log. During recovery, the replica loads the latest checkpoint and re-executes the blocks after the latest checkpointed block. When performing checkpointing, the previous checkpoint is not overwritten via PostgreSQL's multi-versioned storage. Therefore, if a replica crashes during checkpointing, it can still recover from the previous checkpoint.

Private blockchains support node authentication to allow only identified nodes to join and must ensure that they are tamper-proof. For node authentication, the user authentication in the consensus layer can be reused such that only identified clients can submit transactions. The replicas are also authenticated when connecting to the consensus layer. Since the input determines the final states in blockchain protocol 100, ensuring a tamper-proof input guarantees the tamper-proof of the final state. Therefore, blockchain 150 includes in each block a hash of the previous block like a typical blockchain, such that any tampered block could be identified by back-tracing the hash values from the latest block.

Figure 6:
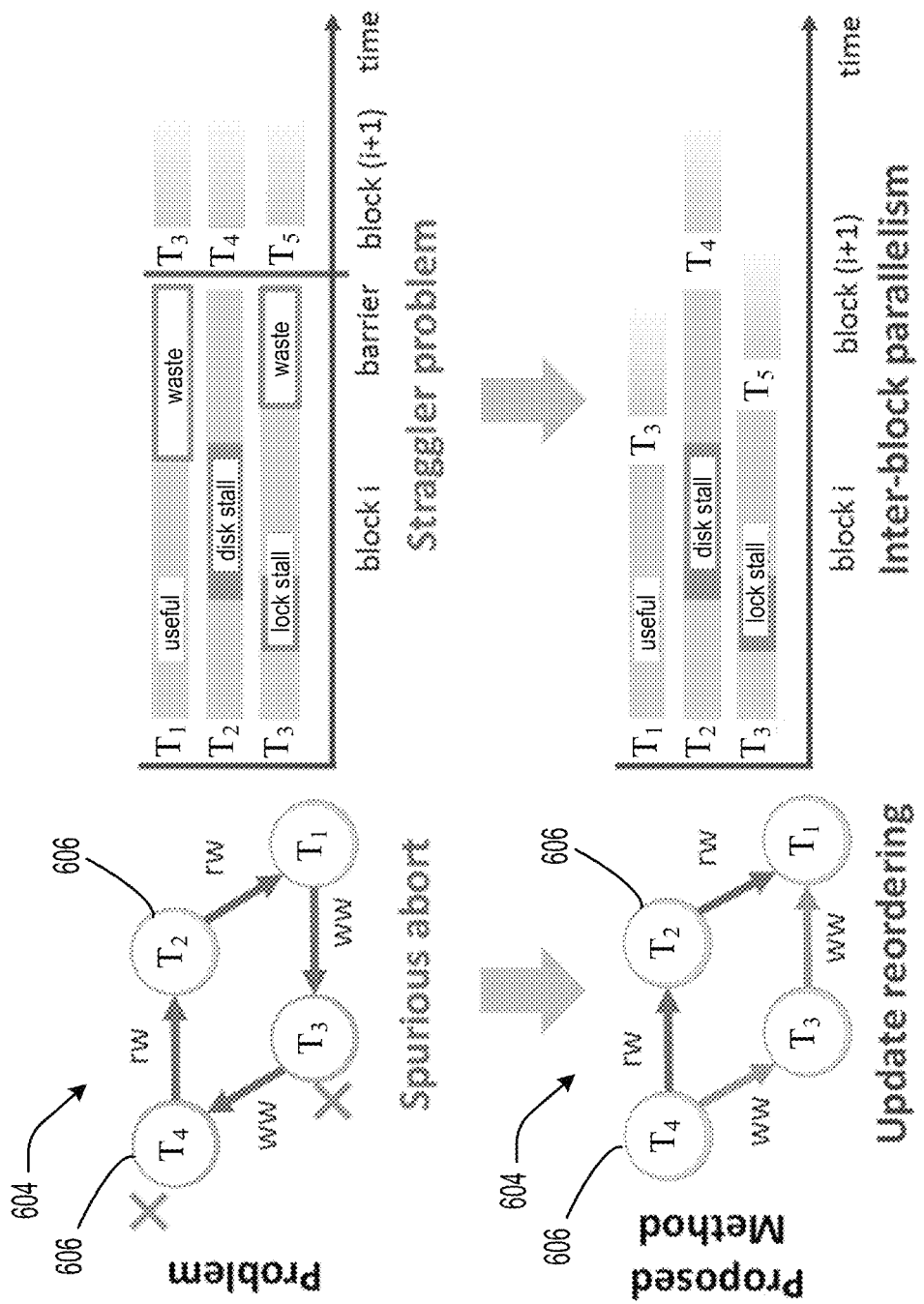
FIG. 6 illustrates a particular example of building a blockchain that implements a blockchain protocol.

FIG. 6 illustrates a particular example of building a blockchain 150 that implements blockchain protocol 100. FIG. 6 shows a set of dependency graphs 604 each includes a set of transactions 606. The upper portion of FIG. 6 shows a few problems associated with conventional blockchains. The upper left portion of FIG. 6 shows a set of spurious aborts. Aborting a transaction on seeing a ww-dependency is overly conservative because two transactions $T_1$ and $T_2$ that update the same item x can still form a serializable schedule. While spurious aborts are acceptable in Aria because retrying an aborted transaction in main-memory databases is cheap-which is not the case in private blockchains because retrying a transaction means going through consensus and disk I/Os again. The upper right portion of FIG. 6 shows the straggler problem. Aria has strict barriers between blocks, i.e., only after block i has finished execution, block (i+1) can start, which causes the straggler problem. Due to disk stalls, the variance of the transaction runtime in private blockchains is higher than main-memory databases, and thus the straggler problem is exaggerated.

In the lower portion of FIG. 6, the ww-dependencies are reordered following the direction of the rw-dependencies, the backward edges are eliminated and thus cycles are avoided in the dependency graph. The reason behind the straggler problem is the barrier between blocks. As shown in FIG. 6, blockchain protocol 100 breaks the block barrier and allows adjacent blocks to run concurrently, which can improve the resource utilization.

Next, an evaluation of blockchain 150 will be discussed. To evaluate blockchain 150 implementing blockchain protocol 100, two types of clusters were used. First, a default cluster was used consisting of 7 machines with Intel Xeon E5-2620v4, 64 GB DRAM and 800 GB SSD, with nodes connected using 1 Gbps Ethernet. This mimics the default setting of recent disk-based blockchains. Second, a cloud cluster was used consisting of 80 t3.2xlarge instances on AWS, each of which has 8 vCPUs, 32 GB DRAM, and 30 GB SSD. Nodes were either located in LAN (5 Gbps Ethernet) or in WAN (across 4 regions on 4 different continents). The cloud cluster was used to study the scalability. All nodes were run on 64-bit CentOS 7.6 with Linux Kernel 3.10.0 and GCC 4.8.5.

Blockchain 150 was compared with two SOV private blockchains: (1) Fabric v2.3 and (2) FastFabric #(the latest progeny of Fabric; an optimized implementation of Fabric #; also better than Fabric++ and FastFabric). The system parameters were tuned to optimal. Also included was an OE blockchain (3) RBC. Since RBC is not open-sourced, it was implemented using the same framework as blockchain 150. PostgreSQL was also chainified using Aria as an OE private blockchain, namely (4) AriaBC. AriaBC was also implemented using the same framework as blockchain 150 because its original implementation is only an in-memory standalone implementation without integrating into a real system. Hence, all OE blockchains that were evaluated were implemented using the same framework. All OE-based blockchain implementations (including blockchain 150) provided the same security guarantees as the SOV-based blockchains and used the same consensus layer (Kafka by default). All SOV-based blockchains were given advantages because they use simpler key-value storage while RBC, AriaBC, and blockchain 150 are relational. Systems that require static analysis (Calvin, ChainifyDB, PWV, and etc.) were not included because of their application limitations. Blockchains were excluded that rely on trusted hardware (e.g., CCF uses SGX) because blockchain 150 does not make any assumption on trusted hardware. Benchmarks used included YCSB, Smallbank, and TPC-C benchmarks.

Figure 7:
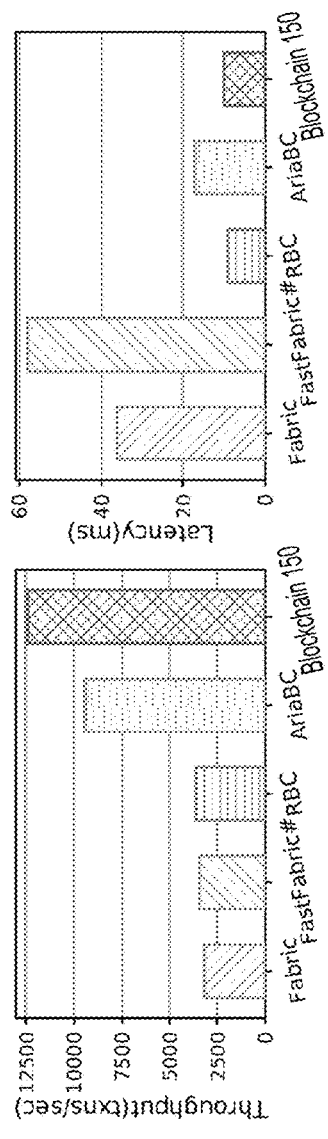
FIG. 7 shows peak throughput and the end-to-end latency experimental results for a blockchain against conventional blockchains using the Smallbank benchmark.

FIG. 7 shows peak throughput and the end-to-end latency experimental results for blockchain 150 against conventional blockchains using the Smallbank benchmark. Blockchain 150 attains 3.5× throughput over the best of the existing private blockchains (i.e., RBC in this experiment). It also achieves around 70% lower latency than SOV blockchains (Fabric and FastFabric #) because the OE architecture has fewer round-trips. RBC has similar latency as blockchain 150 but attains lower throughput because RBC admits a lower level of concurrency.

Figure 8:
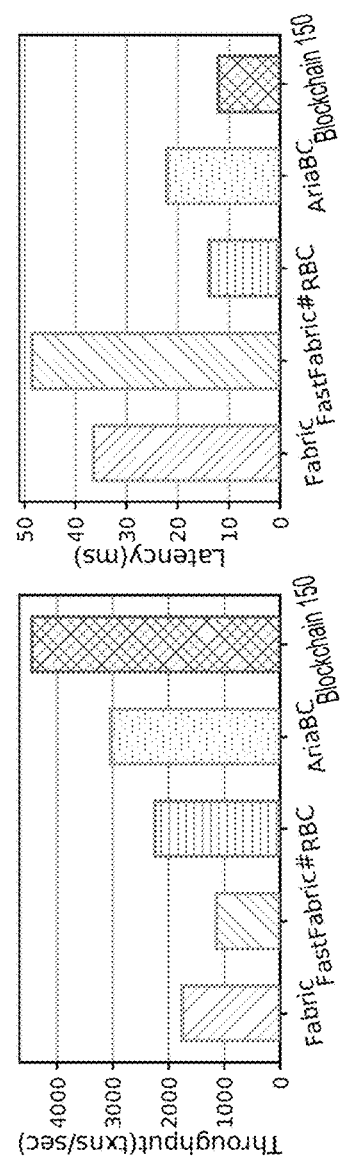
FIG. 8 shows peak throughput and the end-to-end latency experimental results for a blockchain against conventional blockchains using the YCSB benchmark.

FIG. 8 shows peak throughput and the end-to-end latency experimental results for blockchain 150 against conventional blockchains using the YCSB benchmark. Blockchain 150 attains 2.0× throughput over the best of the existing private blockchains (i.e., RBC in this experiment), and also achieves significantly lower latency than SOV blockchains. Blockchain 150 attains a larger margin (e.g., 1.5× throughput over AriaBC in YCSB), demonstrating the effectiveness of Blockchain 150's blockchain-specific optimizations (e.g., low abort rate and inter-block parallelism). AriaBC has a slightly larger latency than blockchain 150 because its optimal block size is larger.

Figure 9:
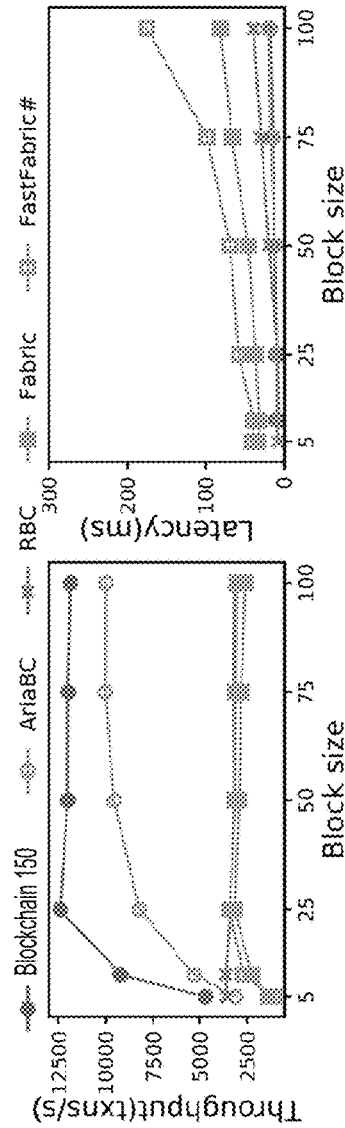
FIG. 9 shows peak throughput and the end-to-end latency experimental results for a blockchain against conventional blockchains using the Smallbank benchmark with varying block sizes.

FIG. 9 shows peak throughput and the end-to-end latency experimental results for blockchain 150 against conventional blockchains using the Smallbank benchmark with varying block sizes (number of transactions per block). The block size is also the degree of concurrency for blockchains that support concurrent transactions (e.g., blockchain 150, AriaBC, and RBC) because they can execute all transactions of a block in parallel using one process/thread per transaction. When the block size is very small (e.g., 5), the throughput is low because of the limited degree of concurrency. The throughput also drops when the block size is too large, because of the increased number of conflicts and lock contentions. The throughput drops are less noticeable in Smallbank when block size>50 because transactions in Smallbank access fewer records and thus have fewer conflicts.

Figure 10:
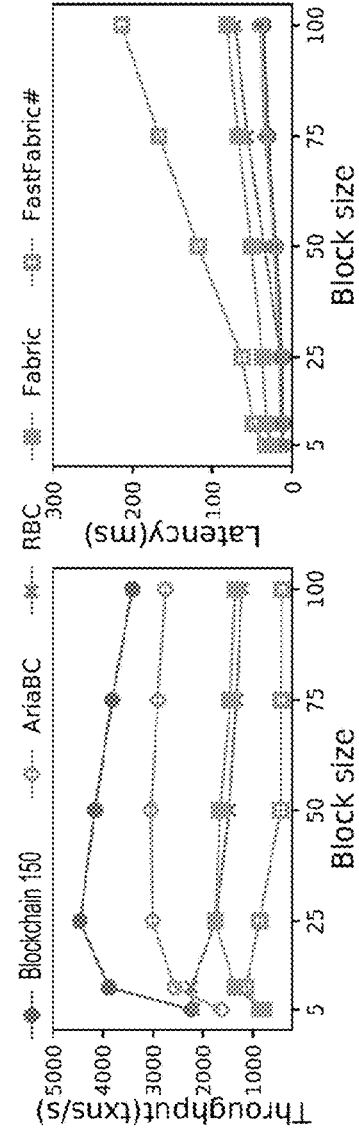
FIG. 10 shows peak throughput and the end-to-end latency experimental results for a blockchain against conventional blockchains using the YCSB benchmark with varying block sizes.

FIG. 10 shows peak throughput and the end-to-end latency experimental results for blockchain 150 against conventional blockchains using the YCSB benchmark with varying block sizes (number of transactions per block). Blockchain 150's optimal block size is 25 for both YCSB and Smallbank, while RBC has a smaller optimal block size (i.e., 10) because it commits transactions serially such that a larger block size does not increase the level of concurrency much. In contrast, AriaBC's optimal block size is larger (50 for YCSB and 75 for Smallbank) because it favors more concurrency since Aria is originally designed for a highly concurrent main-memory database.

Figure 11:
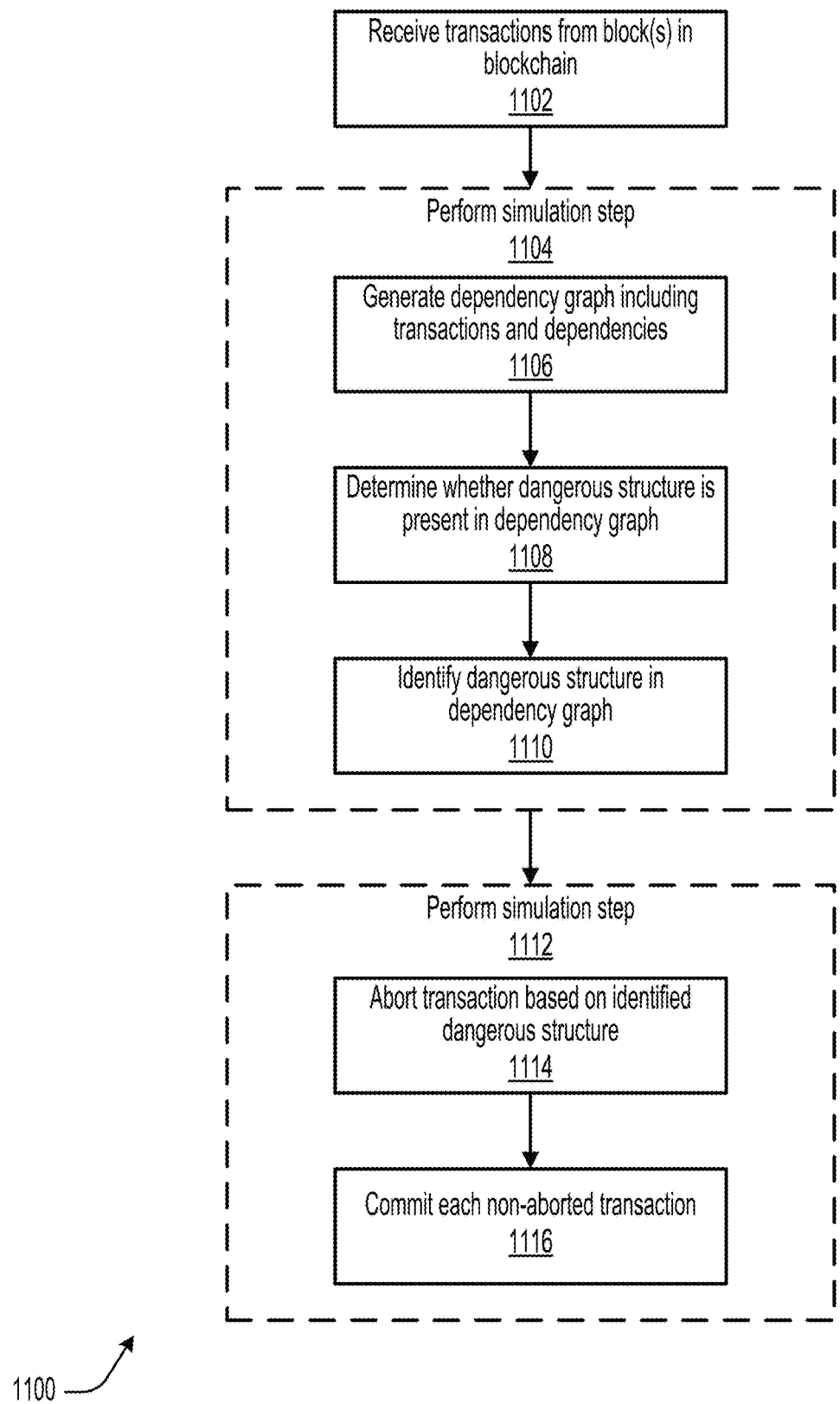
FIG. 11 illustrates a method of processing transactions from one or more blocks in a blockchain.

FIG. 11 illustrates a method 1100 of processing/executing transactions from one or more blocks in a blockchain, in accordance with some embodiments of the present disclosure. Steps of method 1100 may be performed in any order and/or in parallel, and one or more steps of method 1100 may be optionally performed. One or more steps of method 1100 may be performed by one or more processors. Method 1100 may be implemented as a computer-readable medium or computer program product comprising instructions which, when the program is executed by one or more processors, cause the one or more processors to carry out the steps of method 1100.

At step 1102, a set of transactions (e.g., transactions 106, 206, 306, 506, 606) are received at a node (e.g., nodes 108). The set of transactions may be from one or more blocks (e.g., blocks 102, 502) of a blockchain (e.g., blockchain 150). The blockchain may adhere to a blockchain protocol (e.g., blockchain protocol 100). The blockchain protocol may be a deterministic concurrency control protocol.

At step 1104, a simulation step is performed at the node. The simulation step may include one or more of steps 1106 to 1110, as well as other steps described herein.

At step 1106, a dependency graph (e.g., dependency graphs 204, 304, 504, 604) is generated at the node. The dependency graph may be generated to include the set of transactions and a set of dependencies between the set of transactions. The set of dependencies may include one or more read-write dependencies (e.g., rw-dependencies), one or more write-write dependencies (e.g., ww-dependencies), and/or one or more write-read dependencies (e.g., wr-dependencies).

At step 1108, the dependency graph is searched to determine whether a dangerous structure is present in the dependency graph. In some examples, the dangerous structure may include a pair of read-write dependencies. The pair of read-write dependencies may include a first read-write dependency from a second transaction to a first transaction, and a second read-write dependency from a third transaction to the second transaction. In some examples, a transaction ID of the first transaction is less than a transaction ID of the second transaction, and the transaction ID of the first transaction is less than or equal to a transaction ID of the third transaction.

At step 1110, the dangerous structure is identified in the dependency graph. In some examples, identifying the dangerous structure may include identifying the pair of read-write dependencies. In some examples, identifying the dangerous structure may further include determining that the transaction ID of the first transaction is less than the transaction ID of the second transaction, and determining that the transaction ID of the first transaction is less than or equal to the transaction ID of the third transaction.

At step 1112, a commit step is performed at the node. The commit step may include one or more of steps 1114 to 1116, as well as other steps described herein.

At step 1114, one transaction from the group consisting of the first transaction, the second transaction, and the third transaction is aborted. In some examples, the first transaction is aborted. In some examples, the second transaction is aborted. In some examples, the third transaction is aborted. In some examples, the aborted transaction is selected based on whether the second read-write dependency is an inter-block dependency. For example, if the second transaction and the third transaction are from different blocks in the blockchain and the second read-write dependency is an inter-block dependency, the third transaction is aborted. As another example, if the second transaction and the third transaction are from a same block in the blockchain and the second read-write dependency is not an inter-block dependency, the second transaction is aborted.

At step 1116, each non-aborted transaction from the set of transactions is committed. Step 1116 may include committing each non-aborted transaction from the group consisting of the first transaction, the second transaction, and the third transaction. For example, if the second transaction is aborted in step 1114, the first transaction and the third transaction is committed in step 1116. As another example, if the third transaction is aborted in step 1114, the first transaction and the second transaction is committed in step 1116. In some examples, committing each non-aborted transaction may include adding/implementing each non-aborted transaction to the blockchain.

Figure 12:
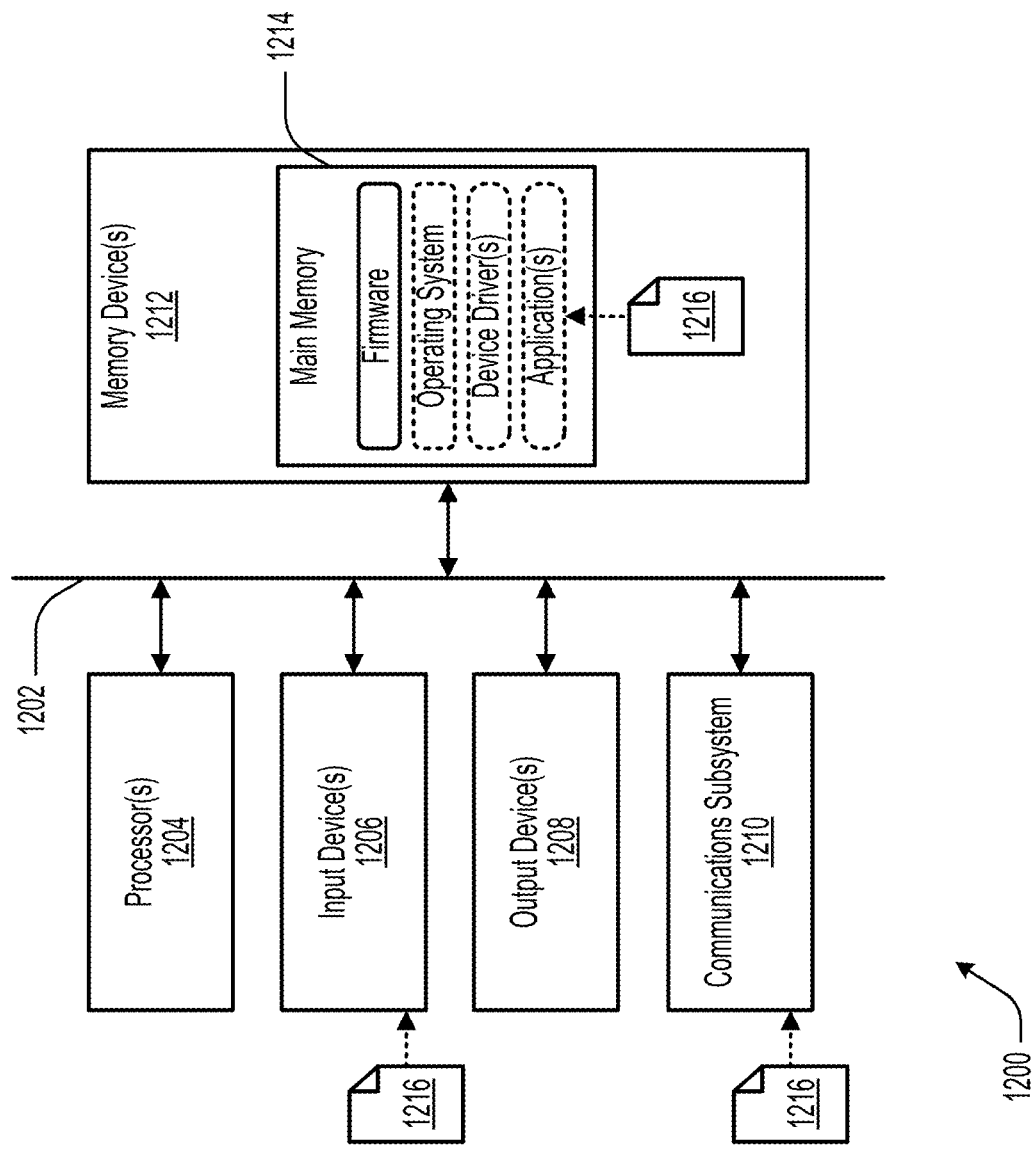
FIG. 12 illustrates an example computer system comprising various hardware elements.

FIG. 12 illustrates an example computer system 1200 comprising various hardware elements, in accordance with some embodiments of the present disclosure. Computer system 1200 may be incorporated into or integrated with devices described herein and/or may be configured to perform some or all of the steps of the methods provided by various embodiments. For example, in various embodiments, computer system 1200 may be incorporated into nodes 108 and/or may be configured to perform method 1100. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

In the illustrated example, computer system 1200 includes a communication medium 1202, one or more processor(s) 1204, one or more input device(s) 1206, one or more output device(s) 1208, a communications subsystem 1210, and one or more memory device(s) 1212. Computer system 1200 may be implemented using various hardware implementations and embedded system technologies. For example, one or more elements of computer system 1200 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 1200 may be communicatively coupled via communication medium 1202. While communication medium 1202 is illustrated as a single connection for purposes of clarity, it should be understood that communication medium 1202 may include various numbers and types of communication media for transferring data between hardware elements. For example, communication medium 1202 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1202 may include one or more buses that connect the pins of the hardware elements of computer system 1200. For example, communication medium 1202 may include a bus that connects processor(s) 1204 with main memory 1214, referred to as a system bus, and a bus that connects main memory 1214 with input device(s) 1206 or output device(s) 1208, referred to as an expansion bus. The system bus may itself consist of several buses, including an address bus, a data bus, and a control bus. The address bus may carry a memory address from processor(s) 1204 to the address bus circuitry associated with main memory 1214 in order for the data bus to access and carry the data contained at the memory address back to processor(s) 1204. The control bus may carry commands from processor(s) 1204 and return status signals from main memory 1214. Each bus may include multiple wires for carrying multiple bits of information and each bus may support serial or parallel transmission of data.

Processor(s) 1204 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 1204 may include one or more multi-core processors, in which each core may read and execute program instructions concurrently with the other cores, increasing speed for programs that support multithreading.

Input device(s) 1206 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 1206 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1208 may include one or more of various devices that convert information into human-readable form, such as without limitation a display device, a speaker, a printer, a haptic or tactile device, and/or the like. Output device(s) 1208 may also include devices for writing to removable storage devices or other removable media, such as those described in reference to input device(s) 1206. Output device(s) 1208 may also include various actuators for causing physical movement of one or more components. Such actuators may be hydraulic, pneumatic, electric, and may be controlled using control signals generated by computer system 1200.

Communications subsystem 1210 may include hardware components for connecting computer system 1200 to systems or devices that are located external to computer system 1200, such as over a computer network. In various embodiments, communications subsystem 1210 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1212 may include the various data storage devices of computer system 1200. For example, memory device(s) 1212 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 1204 and memory device(s) 1212 are illustrated as being separate elements, it should be understood that processor(s) 1204 may include varying levels of on-processor memory, such as processor registers and caches that may be utilized by a single processor or shared between multiple processors.

Memory device(s) 1212 may include main memory 1214, which may be directly accessible by processor(s) 1204 via the address and data buses of communication medium 1202. For example, processor(s) 1204 may continuously read and execute instructions stored in main memory 1214. As such, various software elements may be loaded into main memory 1214 to be read and executed by processor(s) 1204 as illustrated in FIG. 12. Typically, main memory 1214 is volatile memory, which loses all data when power is turned off and accordingly needs power to preserve stored data. Main memory 1214 may further include a small portion of non-volatile memory containing software (e.g., firmware, such as BIOS) that is used for reading other software stored in memory device(s) 1212 into main memory 1214. In some embodiments, the volatile memory of main memory 1214 is implemented as RAM, such as dynamic random-access memory (DRAM), and the non-volatile memory of main memory 1214 is implemented as read-only memory (ROM), such as flash memory, erasable programmable read-only memory (EPROM), or electrically erasable programmable read-only memory (EEPROM).

Computer system 1200 may include software elements, shown as being currently located within main memory 1214, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1216, which are executable by computer system 1200. In one example, such instructions 1216 may be received by computer system 1200 using communications subsystem 1210 (e.g., via a wireless or wired signal that carries instructions 1216), carried by communication medium 1202 to memory device(s) 1212, stored within memory device(s) 1212, read into main memory 1214, and executed by processor(s) 1204 to perform one or more steps of the described methods. In another example, instructions 1216 may be received by computer system 1200 using input device(s) 1206 (e.g., via a reader for removable media), carried by communication medium 1202 to memory device(s) 1212, stored within memory device(s) 1212, read into main memory 1214, and executed by processor(s) 1204 to perform one or more steps of the described methods.

In some embodiments of the present disclosure, instructions 1216 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 1200. For example, the non-transitory computer-readable medium may be one of memory device(s) 1212 (as shown in FIG. 12). In some cases, the non-transitory computer-readable medium may be separate from computer system 1200. In one example, the non-transitory computer-readable medium may be a removable medium provided to input device(s) 1206 (as shown in FIG. 12), such as those described in reference to input device(s) 1206, with instructions 1216 being read into computer system 1200 by input device(s) 1206. In another example, the non-transitory computer-readable medium may be a component of a remote electronic device, such as a mobile phone, that may wirelessly transmit a data signal that carries instructions 1216 to computer system 1200 and that is received by communications subsystem 1210 (as shown in FIG. 12).

Instructions 1216 may take any suitable form to be read and/or executed by computer system 1200. For example, instructions 1216 may be source code (written in a human-readable programming language such as Java, C, C++, C#, Python), object code, assembly language, machine code, microcode, executable code, and/or the like. In one example, instructions 1216 are provided to computer system 1200 in the form of source code, and a compiler is used to translate instructions 1216 from source code to machine code, which may then be read into main memory 1214 for execution by processor(s) 1204. As another example, instructions 1216 are provided to computer system 1200 in the form of an executable file with machine code that may immediately be read into main memory 1214 for execution by processor(s) 1204. In various examples, instructions 1216 may be provided to computer system 1200 in encrypted or unencrypted form, compressed or uncompressed form, as an installation package or an initialization for a broader software deployment, among other possibilities.

In one aspect of the present disclosure, a system (e.g., computer system 1200) is provided to perform methods in accordance with various embodiments of the present disclosure. For example, some embodiments may include a system comprising one or more processors (e.g., processor(s) 1204) that are communicatively coupled to a non-transitory computer-readable medium (e.g., memory device(s) 1212 or main memory 1214). The non-transitory computer-readable medium may have instructions (e.g., instructions 1216) stored therein that, when executed by the one or more processors, cause the one or more processors to perform the methods described in the various embodiments.

In another aspect of the present disclosure, a computer-program product that includes instructions (e.g., instructions 1216) is provided to perform methods in accordance with various embodiments of the present disclosure. The computer-program product may be tangibly embodied in a non-transitory computer-readable medium (e.g., memory device(s) 1212 or main memory 1214). The instructions may be configured to cause one or more processors (e.g., processor(s) 1204) to perform the methods described in the various embodiments.

In another aspect of the present disclosure, a non-transitory computer-readable medium (e.g., memory device(s) 1212 or main memory 1214) is provided. The non-transitory computer-readable medium may have instructions (e.g., instructions 1216) stored therein that, when executed by one or more processors (e.g., processor(s) 1204), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of processing a set of transactions from one or more blocks in a blockchain, the method comprising:
   receiving the set of transactions at a node;
   performing a simulation step by:
     generating a dependency graph comprising the set of transactions and a set of dependencies between the set of transactions, the set of dependencies including one or more read-write dependencies and one or more write-write dependencies; and identifying in the dependency graph one or more occurrences of a dangerous structure, the dangerous structure including a first read-write dependency from a second transaction to a first transaction, and a second read-write dependency from a third transaction to the second transaction, wherein a transaction ID of the first transaction is less than a transaction ID of the second transaction, and the transaction ID of the first transaction is less than or equal to a transaction ID of the third transaction; and performing a commit step by:

in response to identifying the one or more occurrences of the dangerous structure, aborting one transaction from the first transaction, the second transaction, and the third transaction for each of the one or more occurrences of of the dangerous structure in the dependency graph;

for a subset of the set of transactions having a write-write dependency within the dependency graph, determining a commit order for the subset of transactions based on an ascending order of a minimal outgoing transaction ID associated with each transaction in the subset, wherein the minimal outgoing transaction ID is based on one or more read-write dependencies from other transactions to each transaction in the subset; and committing each non-aborted transaction of the set of transactions, wherein committing the subset of the set of transactions having the write-write dependency is performed according to the determined commit order to resolve the write-write dependency without an abort.

2. The method of claim 1, wherein, during the commit step, the second transaction is aborted and the first transaction and the third transaction are committed for at least one of the one or more occurrences of the dangerous structure in the dependency graph.

3. The method of claim 1, wherein the first transaction, the second transaction, and the third transaction are from a same block in the blockchain for at least one of the one or more occurrences of the dangerous structure in the dependency graph.

4. The method of claim 1, wherein the one or more blocks in the blockchain include a first block and a second block immediately following the first block, wherein at least one of the first transaction, the second transaction, and the third transaction is from the first block, and wherein at least one of the first transaction, the second transaction, and the third transaction is from the second block for at least one of the one or more occurrences of the dangerous structure in the dependency graph.

5. The method of claim 4, wherein, during the commit step:

if the second transaction and the third transaction are from the second block, the second transaction is aborted and the first transaction and the third transaction are committed; and if the second transaction is from the first block and the third transaction is from the second block, the third transaction is aborted and the first transaction and the second transaction are committed.

6. The method of claim 1, wherein the simulation step and the commit step are performed without using static analysis.

7. A system comprising:

one or more processors; and a computer-readable medium comprising instructions that, when executed by the one or more processors, cause the one or more processors to perform operations comprising:

receiving a set of transactions from one or more blocks in a blockchain at a node;

performing a simulation step by:

generating a dependency graph comprising the set of transactions and a set of dependencies between the set of transactions, the set of dependencies including one or more read-write dependencies and one or more write-write dependencies; and identifying in the dependency graph one or more occurrences of a dangerous structure, the dangerous structure including a first read-write dependency from a second transaction to a first transaction, and a second read-write dependency from a third transaction to the second transaction, wherein a transaction ID of the first transaction is less than a transaction ID of the second transaction, and the transaction ID of the first transaction is less than or equal to a transaction ID of the third transaction; and performing a commit step by:

in response to identifying the one or more occurrences of the dangerous structure, aborting one transaction from the first transaction, the second transaction, and the third transaction for each of the one or more occurrences of of the dangerous structure in the dependency graph;

for a subset of the set of transactions having a write-write dependency within the dependency graph, determining a commit order for the subset of transactions based on an ascending order of a minimal outgoing transaction ID associated with each transaction in the subset, wherein the minimal outgoing transaction ID is based on one or more read-write dependencies from other transactions to each transaction in the subset; and committing each non-aborted transaction of the set of transactions, wherein committing the subset of the set of transactions having the write-write dependency is performed according to the determined commit order to resolve the write-write dependency without an abort.

8. The system of claim 7, wherein, during the commit step, the second transaction is aborted and the first transaction and the third transaction are committed for at least one of the one or more occurrences of the dangerous structure in the dependency graph.

9. The system of claim 7, wherein the first transaction, the second transaction, and the third transaction are from a same block in the blockchain for at least one of the one or more occurrences of the dangerous structure in the dependency graph.

10. The system of claim 7, wherein the one or more blocks in the blockchain include a first block and a second block immediately following the first block, wherein at least one of the first transaction, the second transaction, and the third transaction is from the first block, and wherein at least one of the first transaction, the second transaction, and the third transaction is from the second block for at least one of the one or more occurrences of the dangerous structure in the dependency graph.

11. The system of claim 10, wherein, during the commit step:
- if the second transaction and the third transaction are from the second block, the second transaction is aborted and the first transaction and the third transaction are committed; and
- if the second transaction is from the first block and the third transaction is from the second block, the third transaction is aborted and the first transaction and the second transaction are committed.

12. The system of claim 7, wherein the simulation step and the commit step are performed without using static analysis.

13. A non-transitory computer-readable medium comprising instructions that, when executed by one or more processors, cause the one or more processors to perform operations comprising:
- receiving a set of transactions from one or more blocks in a blockchain at a node;
- performing a simulation step by:
  - generating a dependency graph comprising the set of transactions and a set of dependencies between the set of transactions, the set of dependencies including one or more read-write dependencies and one or more write-write dependencies; and
  - identifying in the dependency graph one or more occurrences of a dangerous structure, the dangerous structure including a first read-write dependency from a second transaction to a first transaction, and a second read-write dependency from a third transaction to the second transaction, wherein a transaction ID of the first transaction is less than a transaction ID of the second transaction, and the transaction ID of the first transaction is less than or equal to a transaction ID of the third transaction; and
- performing a commit step by:
  - in response to identifying the one or more occurrences of the dangerous structure, aborting one transaction from the first transaction, the second transaction, and the third transaction for each of the one or more occurrences of of the dangerous structure in the dependency graph;
  - for a subset of the set of transactions having a write-write dependency within the dependency graph, determining a commit order for the subset of transactions based on an ascending order of a minimal outgoing transaction ID associated with each transaction in the subset, wherein the minimal outgoing transaction ID is based on one or more read-write dependencies from other transactions to each transaction in the subset; and
  - committing each non-aborted transaction of the set of transactions, wherein committing the subset of the set of transactions having the write-write dependency is performed according to the determined commit order to resolve the write-write dependency without an abort.

14. The non-transitory computer-readable medium of claim 13, wherein, during the commit step, the second transaction is aborted and the first transaction and the third transaction are committed for at least one of the one or more occurrences of the dangerous structure in the dependency graph.

15. The non-transitory computer-readable medium of claim 13, wherein the first transaction, the second transaction, and the third transaction are from a same block in the blockchain for at least one of the one or more occurrences of the dangerous structure in the dependency graph.

16. The non-transitory computer-readable medium of claim 13, wherein the one or more blocks in the blockchain include a first block and a second block immediately following the first block, wherein at least one of the first transaction, the second transaction, and the third transaction is from the first block, and wherein at least one of the first transaction, the second transaction, and the third transaction is from the second block for at least one of the one or more occurrences of the dangerous structure in the dependency graph.

17. The non-transitory computer-readable medium of claim 16, wherein, during the commit step:
- if the second transaction and the third transaction are from the second block, the second transaction is aborted and the first transaction and the third transaction are committed; and
- if the second transaction is from the first block and the third transaction is from the second block, the third transaction is aborted and the first transaction and the second transaction are committed.

* * * * *